United States Patent
Sankaranarayanan et al.

(10) Patent No.: US 9,165,597 B2
(45) Date of Patent: Oct. 20, 2015

(54) TIME-MULTIPLEXED SINGLE INPUT SINGLE OUTPUT (SISO) DATA RECOVERY CHANNEL

(71) Applicant: Seagate Technology LLC, Cupertino, CA (US)

(72) Inventors: Sundararajan Sankaranarayanan, Fremont, CA (US); Raman Venkataramani, Longmont, CO (US); Rishi Ahuja, Broomfield, CO (US)

(73) Assignee: Seagate Technology LLC, Cupertino, CA (US)

( * ) Notice: Subject to any disclaimer, the term of this patent is extended or adjusted under 35 U.S.C. 154(b) by 63 days.

(21) Appl. No.: 13/931,274

(22) Filed: Jun. 28, 2013

(65) Prior Publication Data
US 2015/0003221 A1     Jan. 1, 2015

(51) Int. Cl.
*H03D 1/04*     (2006.01)
*G11B 20/10*     (2006.01)
*G11B 13/04*     (2006.01)

(52) U.S. Cl.
CPC ........ *G11B 20/10046* (2013.01); *G11B 13/045* (2013.01); *G11B 20/10222* (2013.01)

(58) Field of Classification Search
CPC .............. H04L 25/03057; H04L 2025/03522; H04L 27/01; H04L 27/38; H04J 3/10; G11B 20/10046; G11B 13/045; G11B 20/10222
USPC ......................................................... 375/346
See application file for complete search history.

(56) References Cited

U.S. PATENT DOCUMENTS

| | | | |
|---|---|---|---|
| 6,304,995 B1 | 10/2001 | Smith et al. | |
| 6,307,884 B1 | 10/2001 | Du et al. | |
| 6,993,070 B1 * | 1/2006 | Berthet et al. | ................. 375/232 |
| 7,050,491 B2 | 5/2006 | McDonald et al. | |
| 7,411,928 B2 | 8/2008 | Ghosh et al. | |
| 7,542,507 B2 * | 6/2009 | Sohn | .............................. 375/233 |
| 7,783,962 B2 | 8/2010 | Kwon et al. | |
| 7,900,124 B2 | 3/2011 | Conway et al. | |
| 8,175,201 B2 * | 5/2012 | Mathew et al. | ................. 375/348 |
| 8,199,800 B2 | 6/2012 | Sankaranarayanan et al. | |
| 8,223,989 B2 * | 7/2012 | Sugiyama | ........................ 381/92 |
| 8,711,661 B2 * | 4/2014 | Ng et al. | ..................... 369/13.02 |
| 8,773,811 B2 * | 7/2014 | Xia et al. | .................... 360/78.14 |
| 8,848,310 B2 * | 9/2014 | Buch | ............................. 360/75 |
| 2006/0092056 A1 * | 5/2006 | Hilton | ............................ 341/118 |
| 2007/0008855 A1 | 1/2007 | Hekstra et al. | |
| 2009/0232196 A1 | 9/2009 | Sunaga et al. | |
| 2010/0211830 A1 | 8/2010 | Sankaranarayanan et al. | |
| 2014/0016688 A1 * | 1/2014 | Venkataramani et al. | ..... 375/232 |
| 2014/0241412 A1 * | 8/2014 | Kalbasi et al. | ................. 375/232 |

* cited by examiner

*Primary Examiner* — Dhaval Patel
(74) *Attorney, Agent, or Firm* — Hall Estill Attorneys at Law

(57) ABSTRACT

Apparatus and method for recovering data from a multi-channel input signal, such as but not limited to a readback signal from a bit patterned medium (BPM) having a plurality of subtracks. In accordance with some embodiments, a single input single output (SISO) equalizer is adapted to generate equalized outputs responsive to alternating subchannels of the multi-channel input signal. A detector is adapted to generate estimates of data symbols represented by the input signal responsive to the equalized outputs. A switching circuit is adapted to switch in different equalizer coefficients for use by the SISO equalizer for each of the alternating subchannels in the input signal.

19 Claims, 7 Drawing Sheets

TIME-MULTIPLEXED SINGLE INPUT SINGLE OUTPUT (SISO) DATA RECOVERY CHANNEL

SUMMARY

Various embodiments of the present disclosure are generally directed to data recovery processing, such as in the environment of a read channel of a data storage device.

In accordance with some embodiments, a single input single output (SISO) equalizer stage is adapted to generate equalized outputs responsive to alternating subchannels of a multi-channel input signal. A detector stage is adapted to generate estimates of data symbols represented by the input signal responsive to the equalized outputs. A switching circuit is adapted to sequentially switch in different equalizer coefficients for use by the SISO equalizer for each of the alternating subchannels in the input signal.

These and other features and aspects which characterize various embodiments of the present invention can be understood in view of the following detailed discussion and the accompanying drawings.

DETAILED DESCRIPTION

Figure 1:
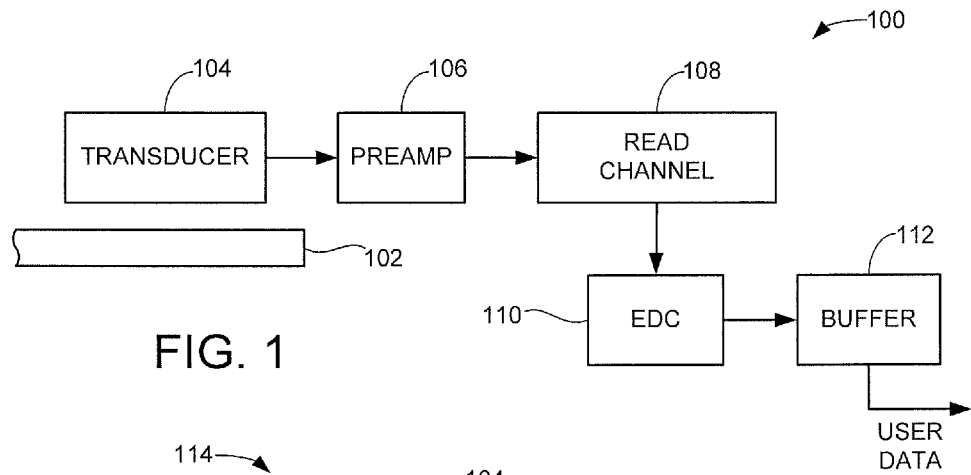
FIG. 1 provides is a functional block representation of a data recovery system in accordance with some embodiments of the present disclosure.

The present disclosure generally relates to the recovery of data in an equalizer-target based readback system, such as but not limited to a data storage device employing rotatable magnetic bit patterned media (BPM).

Digital data may be stored and retrieved in a variety of ways. Bit patterned media (BPM) refers to a type of media having a sequence of magnetic regions arranged as a series of dots, or bits, surrounded by non-magnetic material. The bits, sometimes also referred to as "bit islands," store data in the form of magnetic domains.

The magnetization of the bit islands can be established by a write transducer, which applies a synchronized magnetic field of variable direction to the islands during a write operation. The stored data can be subsequently recovered during a read operation using a read transducer, which may use a magneto-resistive (MR) sensor or other mechanism to generate a readback signal. A data recovery channel can be used to recover the originally written data sequence from the readback signal.

In some forms of BPM, data are written in the form of tracks on a rotatable disc surface, with each track comprising a circumferentially extending sequence of bit islands at a given radius. Each track may be formed of two or more subtracks of bit islands. The bit islands in the subtracks may be staggered or angularly aligned.

While operable in achieving relatively high data storage densities, the use of BPM with subtracks can present a number of challenges during a data recovery operation. The radial position of the read transducer relative to the medium can introduce non-uniform presentation of the bit islands to the transducer, such as in the case of skew and off-track conditions. This can affect the detected signal strength and the relative timing of the respective subtracks. Intersymbol interference (ISI) between adjacent bit islands can further reduce the ability to discern the magnetization states of the respective subtrack sequences.

Equalization and Viterbi detection techniques can be useful in recovering data from complex input channel signals, such as but not limited to BPM subtrack readback signals. Such techniques, however, often require relatively complex hardware or software implementations. A multiple input multiple output (MIMO) detection scheme can be implemented with each of the multiple inputs processing a separate subchannel signal in an input signal. MIMO solutions are known to be optimum in some cases for such environments, but can be costly to implement from a time and resource standpoint.

Accordingly, various embodiments of the present disclosure are generally directed to an apparatus and method for recovering data from a multi-channel input signal having a plurality of alternating subchannels, such as but not limited to a readback signal from bit patterned media utilizing subtracks. In accordance with some embodiments, a single input single output (SISO) equalizer is configured to equalize different subchannels of the input signal. An equalizer coefficient switching circuit repetitively switches in different sets of equalizer coefficients, each suitable for a different one of the subchannel streams. In this way, the SISO equalizer is repetitively time-multiplexed between each of the different subchannels in the input signal.

In further embodiments, a downstream SISO filter stage and a parallel SISO target response block can be time-multiplexed with respective filter and target coefficients for each of the different subchannels in the input signal. A detector block can be used to process the respective outputs of the filter stage and target to reconstruct the original data stream represented by the input signal. A timing circuit can be used to detect timing intervals for the respective subchannels, and to time the switching of the respective coefficients.

In this way, a system with a relatively straightforward SISO based configuration can be time-multiplexed to achieve results that approximate or, in some cases, exceed a MIMO based system, but with significantly reduced hardware and software complexity.

These and other features and benefits of the present disclosure can be understood from a review of FIG. 1 which provides a functional block representation of a data recovery system 100 in accordance with some embodiments. For purposes of providing a concrete example, the system 100 is contemplated as forming a portion of a data storage device that employs rotatable magnetic bit patterned media (BPM) to store user data. The use of BPM is merely illustrative and not limiting, as the various aspects of the present disclosure can be implemented in a variety of environments including data transmission systems that transmit data via a network between a transmitter and a receiver.

The system 100 includes a bit patterned medium 102 which is rotated at a selected rotational velocity during operation by a spindle motor (not shown). A read transducer 104 is controllably positioned adjacent the medium to transduce a readback signal as the transducer 104 passes adjacent one or more tracks defined on the medium 102.

A preamplifier (preamp) 106 conditions the readback signal by applying signal normalization and amplification. A read channel 108 processes the conditioned input signal from the preamp 106 and recovers data therefrom in the form of digital data symbols (e.g., 16-byte words, etc.). An error detection and correction (EDC) circuit 110 applies one or more types of error detection processing to detect and correct up to a selected number of errors in the output digital data.

The corrected data are temporarily stored in a buffer memory 112 pending subsequent transfer of the data to a host device. It is contemplated, albeit not required, that the operation of FIG. 1 described above is carried out during a read operation wherein one or more requested blocks of user data are retrieved to the host device.

In some other embodiments, bit patterned medium 102 may be designed for a heat assisted magnetic recording (HAMR) system where transducer 104 includes a laser delivery mechanism that heats a localized spot on the medium 102 to assist in writing data.

Figure 2A:
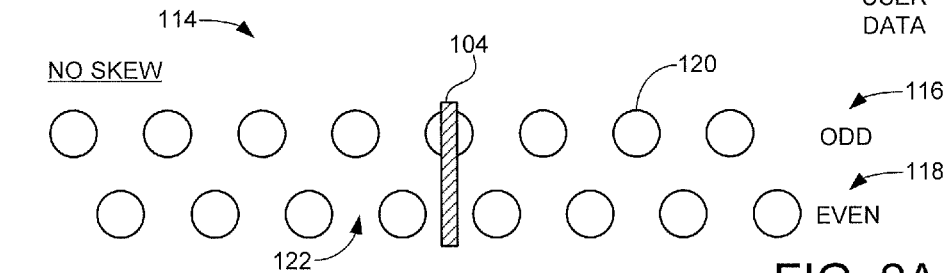
FIGS. 2A-2C depict bit patterned media and the placement of an associated data transducer under different operational conditions.
Figure 2B:
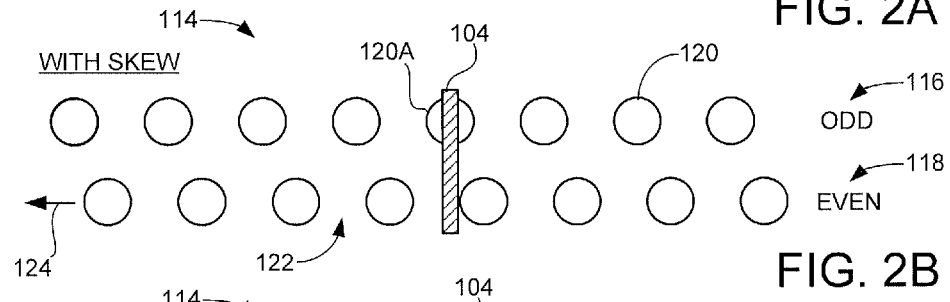
Figure 2C:
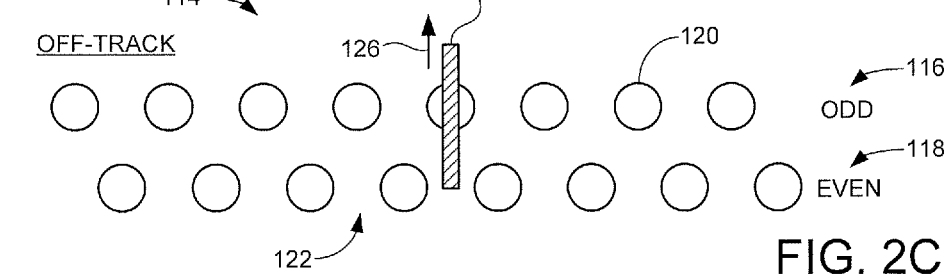

FIGS. 2A-2C depict the patterned medium 102 and the associated read transducer 104 of FIG. 1 in accordance with some embodiments. Data are stored in the form of a series of tracks 114, one of which is shown in each of FIGS. 2A-2C. Each track is made up of two subtracks 116, 118. The upper subtracks 116 are denoted as "odd" subtracks and the lower subtracks 118 are denoted as "even" subtracks. Any number of subtracks can be used in each track, and the medium can be configured to have tracks with different respective numbers of subtracks at different radial locations on the medium.

The respective subtracks are formed from respective sequences of bit islands 120, each constituting a localized magnetic region surrounded by a non-magnetic region 122. Data are written to the tracks 114 by respectively magnetizing the bit islands 120 so as to have periodically alternating magnetic domains (directions). While perpendicular recording is contemplated (e.g., the domains extend into our out of the drawings, respectively), such is merely illustrative and not limiting.

As shown in FIG. 2A, the read transducer 104 is hydrodynamically supported adjacent the rotating medium 102 and has a sensor width (represented by the cross-hatched rectangular area) sufficient to nominally detect the magnetization of both subtracks 116, 118. In the centered and non-skewed arrangement of FIG. 2A, readback pulses will be alternatively detected as each bit island 120 passes adjacent the read transducer 104 in turn.

FIG. 2B illustrates a skewed relationship between the transducer 104 and the track 114. The skew arises from a variety of factors including the use of a rotary actuator that presents the sensing element of the read transducer 104 at different respective angles relative to the medium 102 at different radii. Generally, such skew can be represented by shifting one of the subtracks (in this case, even subtrack 118) relative to the remaining one of the subtracks (e.g., odd subtrack 116) as shown by angular direction 124, which induces a phase offset between the respective subtracks relative to the transducer 104.

Non-zero skew tends to introduce heightened levels of intersymbol interference (ISI) in the down-track direction. The ISI is asymmetric about the center of each dot in the odd subtrack 116; for example, with respect to the bit island (dot) 120A in the odd subtrack 116 over which the transducer 104 is positioned, the ISI is generally increased for the dots in the even subtrack 118 to the right of dot 120A, and ISI is generally decreased for the dots in the even subtrack 118 to the left of dot 120A.

FIG. 2C illustrates an off-track but otherwise centered relationship between the transducer 104 and the track 114. The off-track condition results from the transducer having some amount of positional error in the radial direction, as depicted by arrow 126. The signal strength of the readback signals from the odd subtrack 116 will tend to be greater in magnitude than the signal strength for the odd subtrack 118 due to the differences in relative proximity between the bit islands 120 and the sensor width. It will be appreciated that off-track conditions as depicted in FIG. 2C can arise in the presence of skew as in FIG. 2B. Each of these conditions can degrade the ability of the system 100 of FIG. 1 to accurately recover the stored data.

Figure 3:
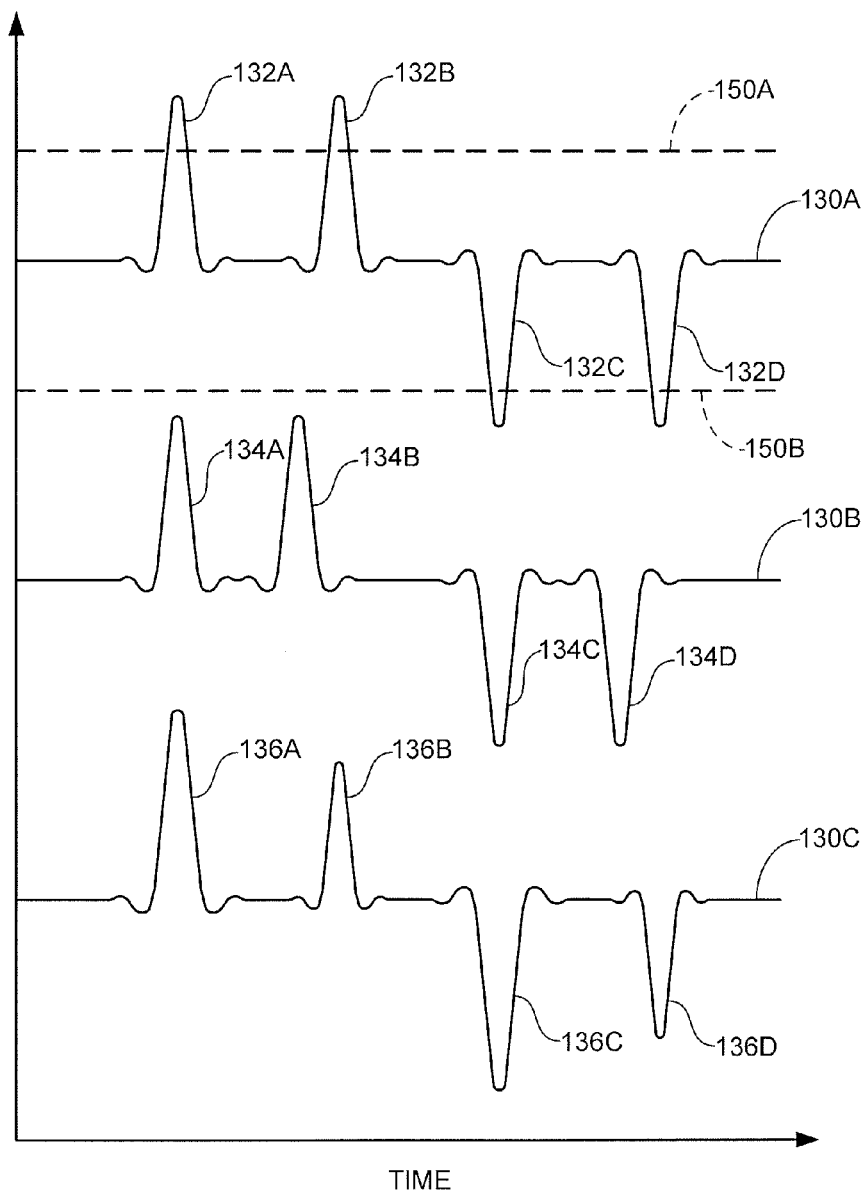
FIG. 3 provides a graphical representation of idealized readback signals that may be obtained from the respective configurations of FIGS. 2A-2C.

To this end, FIG. 3 provides an idealized depiction of the types of readback signals 130A-130C that may be obtained from the respective configurations of FIGS. 2A-2C. Curve 130A generally corresponds to the no-skew, centered condition of FIG. 2A and includes readback pulses 132A-132D that respectively occur as the transducer 104 passes adjacent the bit islands of the subtracks 116, 118. Pulses 132A and 132C are from the odd subtrack 116 and pulses 132B and 132D are from the even subtrack 118. It is contemplated, albeit not required, that at least adjacent pairs of the bit islands will have the same magnetization, so that a given data "bit" may be stored across multiple islands. The pulses 132A-132D are uniformly spaced and have substantially the same pulse magnitudes and other shape characteristics.

Curve 130B corresponds to FIG. 2B and includes pulses 134A-134D. Because of the phase offset of the subtrack 118 compared to subtrack 116, pulses 134B and 134D from subtrack 118 are closer in time to pulses 134A and 134C from subtrack 116. As before, the pulses 134A-134D have similar shape characteristics.

Curve 130C corresponds to FIG. 2C and includes pulses 136A-136D. Because of the track misregistration (TMR), pulses 136A and 136C from subtrack 116 are generally greater in magnitude and pulses 136B and 136D from subtrack 118 are generally smaller in magnitude.

Figure 4:
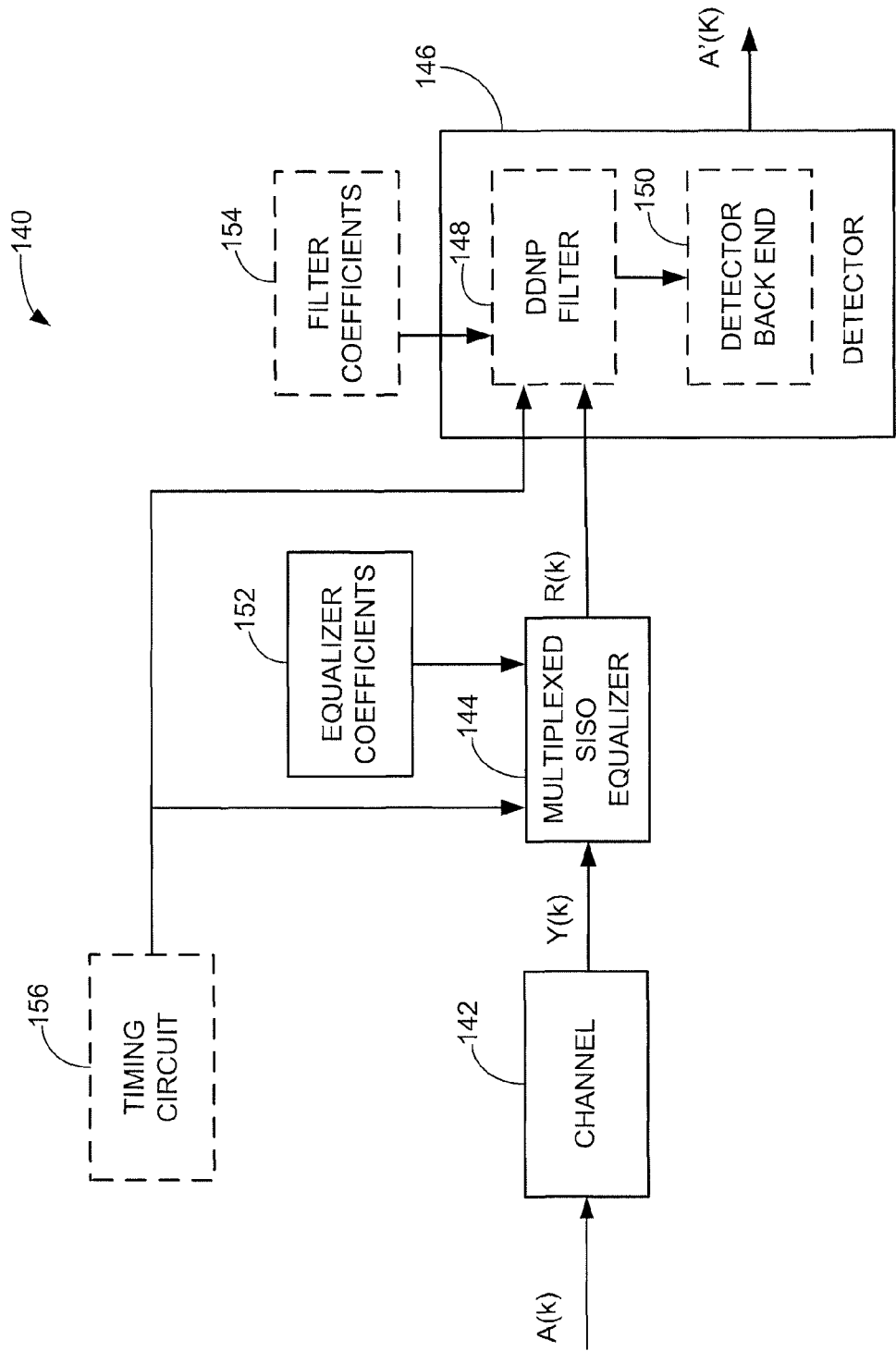
FIG. 4 is a block diagram for portions of the system of FIG. 1 in accordance with some embodiments.

FIG. 4 provides a detection circuit 140. The circuit 140 may form a portion of the system 100 of FIG. 1 in accordance with some embodiments. The circuit 140 is adapted to decode data from complex readback signals such as 130A-130C in FIG. 3. The circuit 140 can be realized in hardware, software and/or firmware as required.

The circuit 140 employs a time-sequenced multiplexed single input single output (SISO) configuration that provides data dependent noise predictive (DDNP) detection. Various coefficients for the different stages of the SISO channel are repetitively switched in for each subtrack at different instances in time. This greatly enhances the readback characteristics of the channel over a standard SISO implementation, and in some cases allow the channel to approximate multiple input multiple output (MIMO) performance where each subtrack is handled using a different, dedicated channel.

FIG. 4 shows the circuit 140 to include a channel or input block 142, a time-multiplexed (mux) single input, single output (SISO) equalizer 144, and a detector 146. The detector 146 may include a time-multiplexed data dependent noise prediction (DDNP) filter block 148 and a detector back end 150. Block 152, implemented as a switching circuit in some embodiments, provides equalizer coefficients to the mux SISO equalizer 144, and block 154 provides filter coefficients (in some embodiments, DDNP filter coefficients) to the mux filter. In some embodiments, a timing block 156 provides timing inputs to the equalizer 144 and the filter 148.

Input multi-channel data samples A(k) are subjected to a channel response as represented by block 142 to provide samples Y(k) that may have a white noise component. The samples Y(k) are evaluated by the mux SISO equalizer 144 to output equalizer response samples R(k).

The filter block 148 applies data dependent noise prediction (DDNP) filtering to the input samples. The detector back end 150 uses the output from the filtering to output a pulse sequence A'(K) that best corresponds to the input samples supplied to the channel block 142.

The timing circuit 156 provides timing inputs to the respective equalizer 144 and filter 148 blocks. The timing signals enable the circuit 140 to successively evaluate the respective odd and even samples in the input sequence. The equalizer and filter coefficients blocks 152, 154 may take the form of a data structure in memory, such as a lookup table, and outputs multiple sets of coefficients based on the different subchannels in the input signal.

The equalizer coefficients block 152 stores a first set of equalizer coefficients $C_{EO}$ for "odd" intervals (intervals wherein samples from the odd subtrack 116 are evaluated) and a second set of equalizer coefficients $C_{EE}$ for "even" intervals (intervals wherein samples from the even subtrack 118 are evaluated). Similarly, the filter coefficients block 154 stores coefficients $C_{FO}$ and $C_{FE}$ for odd and even subtracks. While separate blocks 152, 154 are shown in FIG. 4, it will be appreciated that the loading of the respective coefficients can be carried out by a consolidated switching circuit or other mechanism.

The respective coefficients can be derived in a variety of ways, including minimum mean square error (MMSE) techniques. A training phase can be applied to enable the coefficients to be adaptively derived and/or changed over time. The respective sets of coefficients can be stored in suitable data structures in memory, such as in the form of a look up table, for ease of reference and output. It will be appreciated that the coefficients are alternately switched in continuously in a synchronized fashion during the entirety read signal analysis event so that the appropriate coefficients are applied to the respective subtrack signals.

Figure 5:
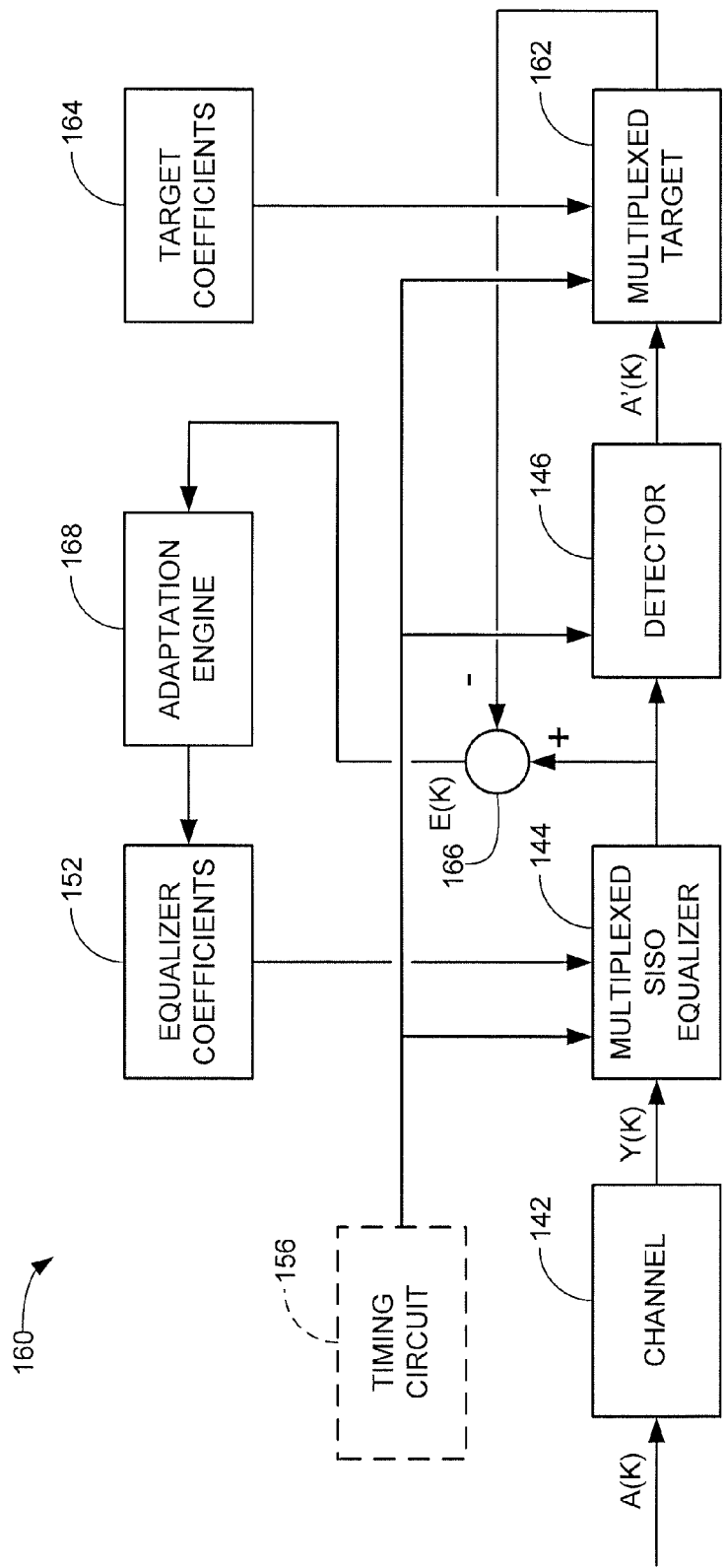
FIG. 5 is a functional representation of a training phase used to generate the coefficients of FIG. 4.

FIG. 5 depicts a training circuit 160 used to establish the coefficients used by the circuit 140 of FIG. 4 in accordance with some embodiments. Similar elements from FIG. 4 are provided with the same reference numerals in FIG. 5. During the training phase, regular data or special test patterns are transduced and provided as a multi-channel sequence of samples A(k) to the channel block 142 as before. The resulting samples Y(k) are processed by the mux SISO equalizer 144 and the detector 146 to provide an output A'(k) to a multiplexed target block 162. The target block 162 uses target coefficients $C_{TE}$ and $C_{TO}$ for the respective even and odd subchannels and outputs samples to summing junction 166, which combines these output samples from the output samples from the mux SISO equalizer 144 as shown to form an error sequence E(K).

The error sequence E(K) is input to an adaptation engine 168 which generates the equalizer coefficients for block 152. Similar techniques can be used to generate the filter and target coefficients.

Figure 6:
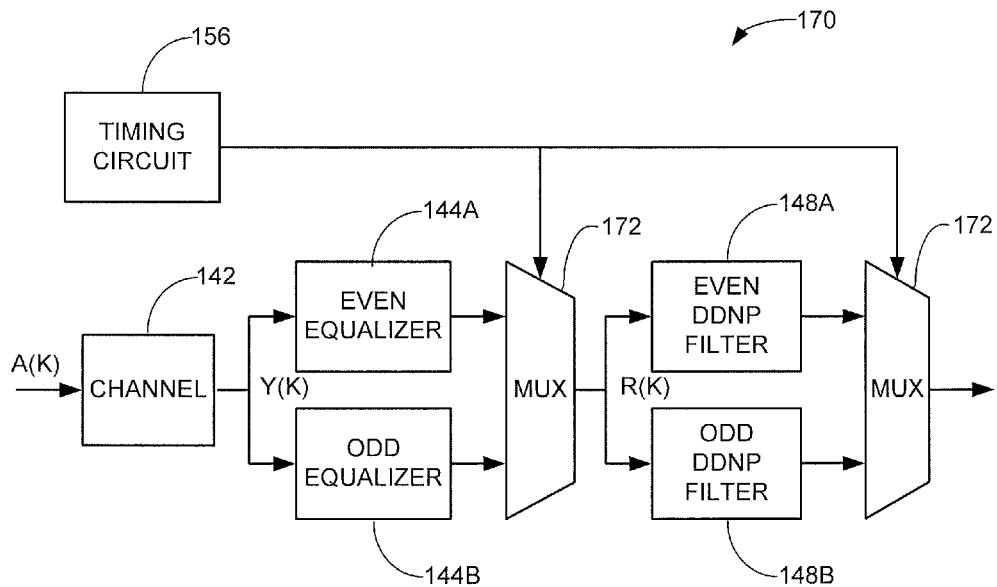
FIG. 6 functionally depicts operation of the circuitry of FIG. 4.

FIG. 6 is a circuit 170 that represents portions of the circuit 140 of FIG. 4 in accordance with some embodiments. The mux SISO equalizer 144 is a single equalizer with a single input and single output, but is conceptualized in FIG. 6 as an even equalizer 144A and an odd equalizer 144B. The loading of the coefficients $C_{EE}$ serve to configure the equalizer as the even equalizer 144A, and the loading of the coefficients $C_{EO}$ serve to configure the equalizer as the odd equalizer 144B. The even samples in the input Y(k) signal are processed by the even equalizer 144A and the odd samples in the input Y(k) signal are processed by the odd equalizer 144B. The outputs are multiplexed by a mux 172.

Similarly, the DDNP filter block 148 is a single filter block but can be conceptualized as an even DDNP filter block 148A which evaluates the even subchannel samples in the input R(k) signal responsive to the loading of the $C_{FE}$ coefficients, and an odd DDNP filter block 148B which evaluates the odd subchannel samples in the input R(k) signal responsive to the loading of the $C_{FO}$ coefficients. A second mux 174 depicts the switching between the respective subchannels. It can be seen that the respective sets of even and odd coefficients are repetitively switched in at a rate established by the timing circuit 156.

Figure 7:
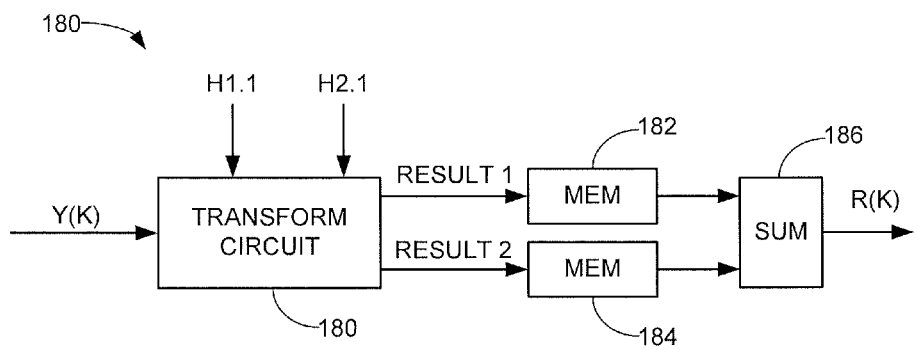
FIG. 7 functionally depicts operation of the circuitry of FIG. 6.

The even and odd equalizers 144A, 144B can be viewed as transform block pairs (e.g., H1/H2) which are repetitively reconfigured for each alternating sample channel (even and odd). As generally depicted in FIG. 7, for a given input pair of subtrack intervals, coefficients for the H1 transform are loaded and used by a transform block 180 during a given odd interval, followed by the loading into the block 180 of the coefficients for the H2 transform during the immediately successive even interval.

The output of the first transform using coefficients H1 ("result 1") generally cannot be retained at the output latch of the block 180 pending generation of the output of the second transform ("result 2"), since the second transform requires the loading of the H2 coefficients into the block 180 and a new calculation using the updated coefficients. A suitable buffer stage, such as memory 182, 184 can thus be added to temporarily store the results of the respective transforms performed by the block 180.

The results can be output from the memory 182, 184 as required to carry out subsequent processing, such as being combined by summer block 186 as shown. Similar multiplexing and output buffering can be carried out for each of the respective transform blocks of the target 172 and filter 174. Any depth of buffering can be used so that multiple outputs can be retained and combined, allowing outputs from multiple intervals to be combined throughout the lattice.

Figure 8:
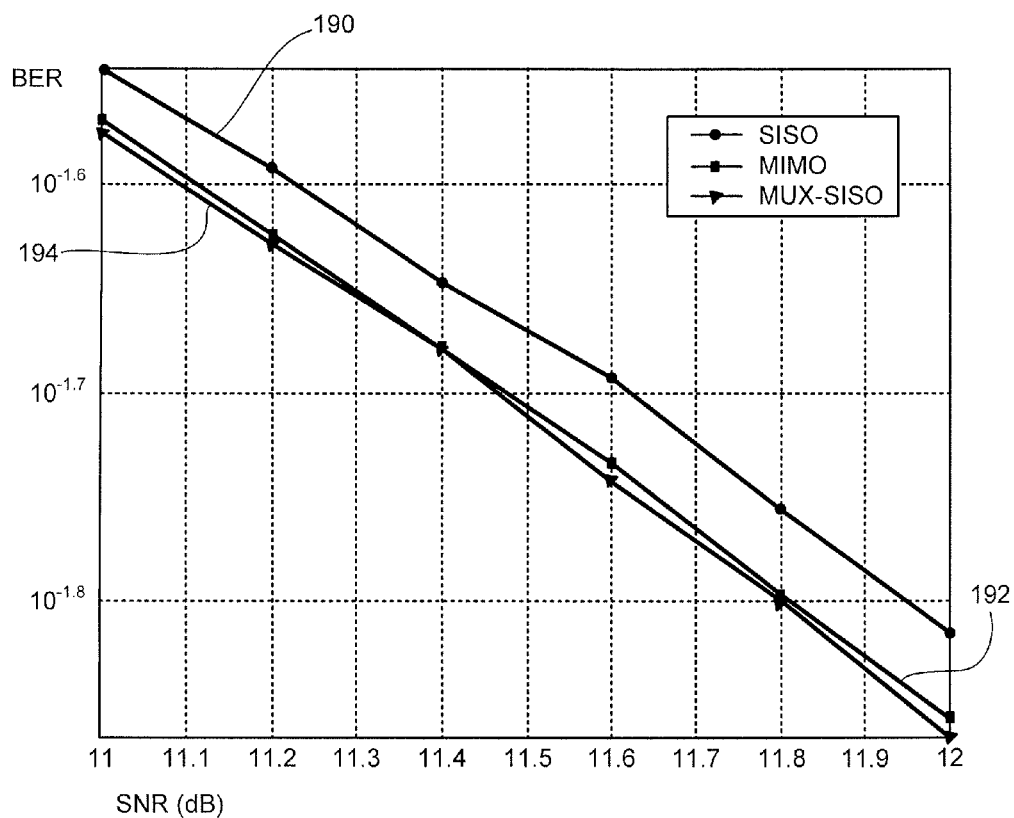
FIG. 8 depicts bit-error rate (BER) characteristics of data recovery in accordance with various embodiments.

FIG. 8 is a graphical representation of response data obtained using different types of channel configurations to evaluate the system as embodied herein. The data are plotted against a signal to noise ratio, SNR (in dB) x-axis and an estimated bit error rate (BER) y-axis. It is contemplated that in each case, a selected percentage of skew was present and DDNP processing was disabled so as to not mask the characteristic performance differences of the different configurations.

Curve 190 in FIG. 8 represents a traditional SISO implementation. Curve 192 represents a traditional MIMO implementation, and curve 194 represents a time-multiplexed (mux) SISO implementation as disclosed herein. It can be seen that the mux SISO curve 194 provides significantly improved performance over the SISO curve 190, and approaches the performance of the MIMO curve 192. FIG. 7 thus demonstrates that near-MIMO levels of performance can be achieved using significantly less complex SISO-based circuitry.

Figure 9:
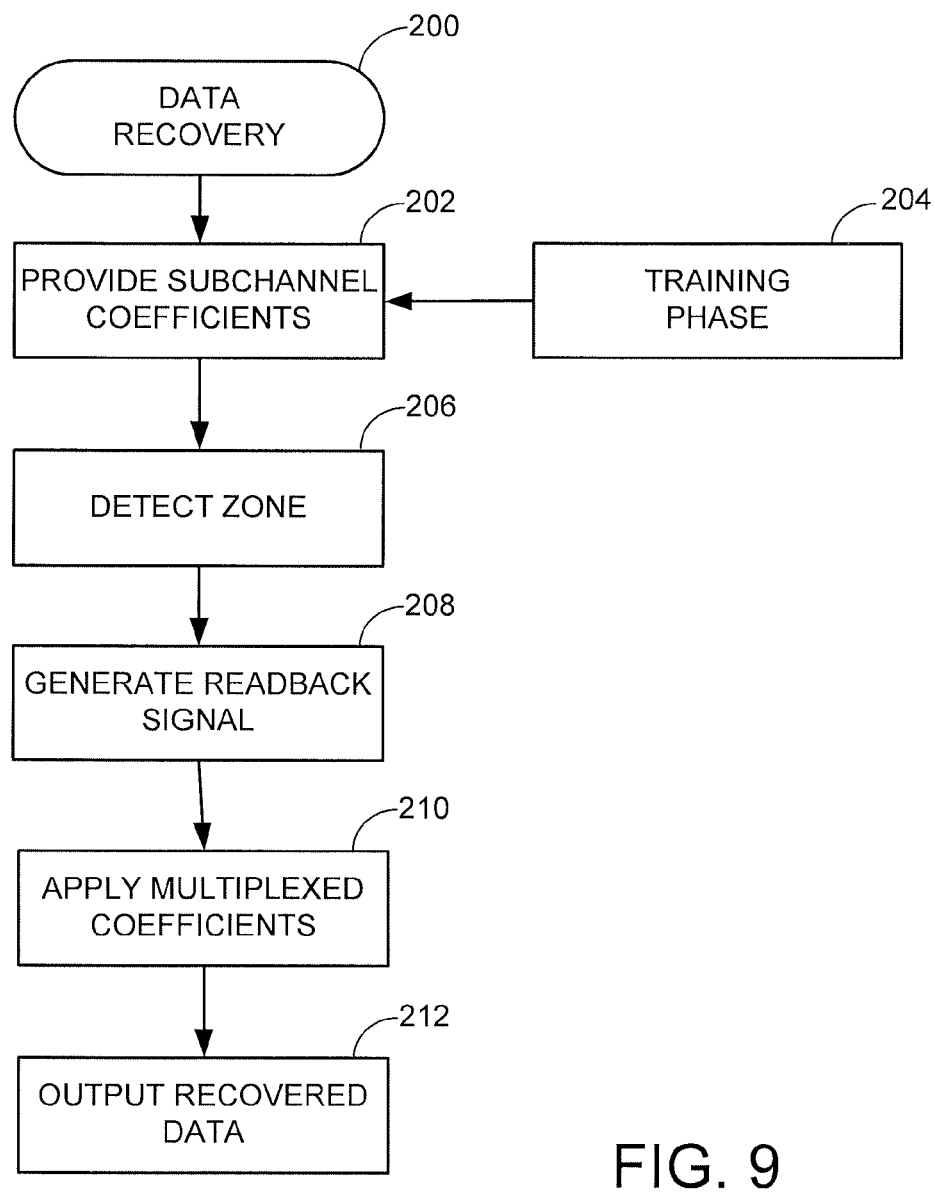
FIG. 9 is a flow chart for a DATA RECOVERY routine illustrative of steps carried out in accordance with some embodiments.

FIG. 9 provides a flow chart for a DATA RECOVERY routine 200 illustrative of steps that may be carried out in accordance with the foregoing discussion. It will be contemplated that the routine 200 is carried out to decode data stored to the bit patterned medium 102 of FIG. 1 using the circuitry of FIGS. 4-7, although such is merely illustrative and not limiting.

Coefficients are first provided for a multiplexed SISO-based system at step 202. The coefficients can be for all or portions of the circuit, including just the filter stages, just the equalizer and target stages, etc. The coefficients can be calculated using a training phase 204, as discussed above in FIG. 5 by evaluating test patterns and using a minimum mean square error (MMSE) approach. Multiple groups of coefficient sets can be determined for different environments; for example, a first group of odd/even coefficient sets can be generated for a first type of pattern with a first total number of subtracks (e.g., 2), and a different group of coefficient sets can be generated for a different, second type of pattern with a different total number of subtracks (e.g., 3).

Figure 10:
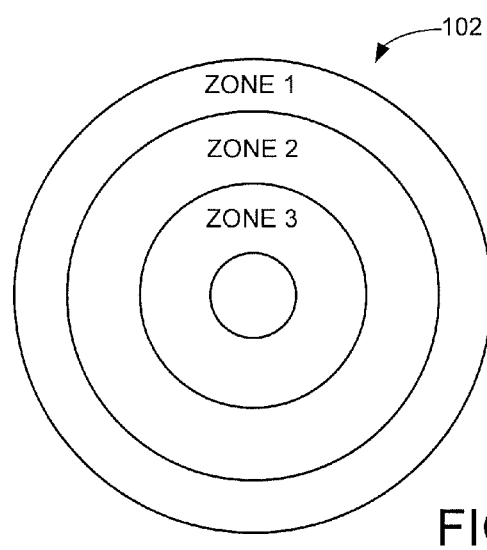
FIG. 10 illustrates different concentric zones of the data storage medium of FIG. 1 that may be provided with different coefficients in accordance with some embodiments.

As shown in FIG. 10, coefficient sets can further be developed for different zones of the medium, such as Zones 1-3 depicted therein. A first type of skew and phase offset may be encountered in the outermost diameter (OD) Zone 1, relatively little to no skew may be present in intermediate Zone 2, and a second, opposing type of skew and phase offset may be encountered in an innermost diameter (ID) Zone 3. Instead of relying of coefficients determined to accommodate such wide variations in skew and other changes in operational environment, each zone can be provided with its own grouping of coefficients which are then switched into the circuit based on detected transducer position.

Different tracks may be further provided with different shapes of the bit islands; for example, rather than the substantially circular bit patterns 120 depicted in FIGS. 2A-2C, rectangular, elongated, continuous, or other shaped bit patterns may be utilized. Indeed, different filter coefficients may be switched in to transduce different types of data, such as servo positional control data versus regular user data. Because of the switched nature of the system, any number of different types of combinations of transforms can be carried out that cannot be readily accomplished by existing systems, including fixed MIMO systems.

The routine of FIG. 9 continues at step 206 to detect the then existing zone of the medium. Other operational conditions such as the amount of skew, phase offset, off-track misregistration, etc. may also be detected during this step. In the case of different sets of coefficients being used for different track addresses as discussed above in FIG. 9, this data may be decoded by servo control circuitry, a hardware manager, etc. detecting the angular and/or radial position of the transducer relative to the medium.

A readback signal is generated at step 208 and presented to a readback circuit (such as 140 in FIG. 4) as a multi-channel sequence. The coefficients from step 202 are successively applied to the multi-channel sequence at step 210 to decode the respective even and odd subchannels (or other subchannels within the sequence). The recovered data are thereafter output at step 212.

It will now be appreciated that the various embodiments disclosed herein can provide a number of benefits. Near MIMO-based levels of performance can be obtained using significantly simpler, less costly SISO-based implementations. Different groups of coefficient sets can be generated, changed, and loaded as required using the same transform circuitry, thereby enhancing the adaptive nature of the decoding effort. Indeed, it is contemplated that performance exceeding that of traditional MIMO-based configurations may be possible in some situations depending on the resolution applied to the generation of the coefficients.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms wherein the appended claims are expressed.

What is claimed is:

1. An apparatus comprising:
a data transducer which generates a multi-channel input signal with alternating subchannels from adjacent subtracks of a medium;
a single input single output (SISO) equalizer adapted to generate equalized outputs responsive to the alternating subchannels;
a detector adapted to generate estimates of data symbols represented by the input signal responsive to the equalized outputs; and
a switching circuit adapted to switch in different equalizer coefficients for use by the SISO equalizer for each of the alternating subchannels in the input signal responsive to changes in position of the transducer with respect to the medium.

2. The apparatus of claim 1, wherein alternating first and second time intervals for the respective subchannels are identified, a first set of the equalizer coefficients is loaded to the SISO equalizer during each occurrence of the first time interval, and a different, second set of the equalizer coefficients is loaded to the SISO equalizer during each occurrence of the second time interval.

3. The apparatus of claim 2, wherein the SISO equalizer comprises at least one transform block, the transform block using the first set of equalizer coefficients to generate a transform output during each of the first time intervals for a first subchannel, the transform block using the second set of equalizer coefficients to generate a transform output during each of the second time intervals for a second subchannel.

4. The apparatus of claim 1, further comprising a SISO target response block adapted to generate target outputs responsive to the alternating subchannels of the input signal, the switching circuit further adapted to sequentially switch in different target coefficients for use by the SISO target response block for each of the alternating subchannels.

5. The apparatus of claim 1, further comprising a SISO filter adapted to filter the output of the SISO equalizer, the switching circuit further adapted to sequentially switch in different filter coefficients for use by the SISO filter for each of the alternating subchannels.

6. The apparatus of claim 1, wherein the detector stage is characterized as a Viterbi decoder.

7. The apparatus of claim 1, wherein each of the subtracks is formed by a series of bit islands comprising localized regions of magnetic material.

8. The apparatus of claim 1, wherein a first set of coefficients is loaded to the SISO equalizer responsive to the data transducer being positioned at a first radius of the medium, and wherein a different, second set of coefficients is loaded to the equalizer responsive to the data transducer being positioned at a different, second radius of the medium, the second set of coefficients overwriting the first set of coefficients.

9. The apparatus of claim 1, further comprising a timing circuit which detects an amount of phase offset between the subchannels and generates timing inputs to the SISO equalizer so that a first set of coefficients is used during a first subchannel interval and a different, second set of coefficients is used during a second subchannel interval.

10. The apparatus of claim 1, further comprising a memory which stores the equalizer coefficients in the form of a look up table, each of the coefficients loaded by the switching circuit replacing a previously loaded set in the equalizer.

11. An apparatus comprising:
a data transducer which generates a multi-channel input signal with alternating subchannels from adjacent subtracks of a bit patterned medium (BPM);
a single input single output (SISO) equalizer configured to receive the input signal;
a detector coupled to an output of the SISO equalizer configured to output data represented by the input signal; and
a switching circuit configured to, responsive to detected timing intervals associated with different subchannels of the multi-input input signal transduced by the transducer from different subtracks of the BPM, repetitively switch in sets of equalizer coefficients to the SISO equalizer and sets of filter coefficients to the detector so that a first combination of the equalizer coefficients and filter coefficients are utilized during a first subchannel timing interval and a different, second combination of the equalizer coefficients and filter coefficients are utilized during a different, second subchannel timing interval, the respective first and second subchannel timing intervals selected responsive to different amounts of skew of the transducer relative to the BPM.

12. The apparatus of claim 11, further comprising a SISO target connected to the SISO equalizer and the detector, the switching circuit further switching in a set of target coefficients to the SISO target during a training phase used to generate the equalizer coefficients and the filter coefficients.

13. The apparatus of claim 11, wherein the detector comprises a data dependent noise prediction (DDNP) filter stage and a detection back end.

14. The apparatus of claim 11, wherein the BPM is divided into a plurality of concentric zones of tracks, the first subchannel timing interval associated with a first zone of the plurality and the second subchannel timing interval associated with a second zone of the plurality.

15. The method of claim 11, wherein the rotatable medium is characterized as a combined bit patterned medium and heat assisted magnetic recording (HAMR) medium.

16. A method comprising:
generating multiple sets of coefficients for a single input single output (SISO) equalizer coupled to a SISO target response block and a SISO filter stage;
using a data transducer to read subtracks on a rotatable medium;
presenting a multi-channel input signal to the SISO equalizer from the transducer;
detecting repetitively occurring, alternating first and different, second timing intervals associated with different subchannels of the input signal associated with different subtracks;
during each first timing interval based on a first radial position of the transducer, using a first set of equalizer coefficients in the SISO equalizer to generate an equalized output responsive to a first subchannel in the input signal; and
during each different, second timing interval based on a second radial position of the transducer, using a second set of equalizer coefficients in the SISO equalizer to generate an equalized output responsive to a second subchannel in the input signal, each subsequently loaded set of equalizer coefficients replacing a previously loaded set of the equalizer coefficients.

17. The method of claim 16, wherein the input signal is generated by the read transducer reading a data track of the rotatable medium, the track comprising a plurality of subtracks.

18. The method of claim 17, wherein each of the subtracks is formed by a series of bit islands comprising localized regions of magnetic material surrounded by a region of nonmagnetic material.

19. The method of claim 17, further comprising dividing the rotatable medium into a plurality of concentric zones, generating a different set of equalizer coefficients for each zone, detecting a selected zone on the medium over which the transducer is disposed, and loading the set of equalizer coefficients associated with the selected zone.

* * * * *